US012791096B2

(12) United States Patent
Matsufuji et al.

(10) Patent No.: US 12,791,096 B2
(45) Date of Patent: Nov. 10, 2026

(54) SHIFTING METHOD OF TRANSMISSION FOR WORK VEHICLE, AND TRANSMISSION FOR WORK VEHICLE

(71) Applicant: JINMYUNG POWERTECH CO., LTD., Siheung-si (KR)

(72) Inventors: Mizuya Matsufuji, Sanda (JP); Sung Jin Hong, Incheon (KR); Sang Woo Shin, Incheon (KR)

(73) Assignee: JINMYUNG POWERTECH CO., LTD., Siheung-si (KR)

( * ) Notice: Subject to any disclaimer, the term of this patent is extended or adjusted under 35 U.S.C. 154(b) by 0 days.

(21) Appl. No.: 18/712,687

(22) PCT Filed: Nov. 19, 2022

(86) PCT No.: PCT/IB2022/061174
§ 371 (c)(1),
(2) Date: May 22, 2024

(87) PCT Pub. No.: WO2023/094957
PCT Pub. Date: Jun. 1, 2023

(65) Prior Publication Data

US 2025/0012355 A1 Jan. 9, 2025

(30) Foreign Application Priority Data

Nov. 23, 2021 (KR) ........................ 10-2021-0162840

(51) Int. Cl.

| | |
|---|---|
| ***F16H 61/04*** | (2006.01) |
| ***F16H 61/28*** | (2006.01) |
| ***F16H 61/30*** | (2006.01) |

(52) U.S. Cl.
CPC ..... *F16H 61/0403* (2013.01); *F16H 61/2807* (2013.01); *F16H 61/30* (2013.01); *F16H 2061/0422* (2013.01)

(58) Field of Classification Search
CPC ...... F16H 61/702; F16H 3/38; F16H 61/0403; F16H 61/2807; F16H 61/30; F16H 2061/0422
See application file for complete search history.

(56) References Cited

U.S. PATENT DOCUMENTS 3,944,035 A * 3/1976 McRay ................. B60W 10/02 192/3.57
3,945,265 A * 3/1976 Bell ........................ F16H 61/30 74/334

(Continued)

FOREIGN PATENT DOCUMENTS

JP 2000-326740 11/2000
JP 2002-295655 10/2002

(Continued)

OTHER PUBLICATIONS

International Search Report for International Application No. PCT/1B2022/061174 date Feb. 23, 2023.

*Primary Examiner* — Jake Cook
(74) *Attorney, Agent, or Firm* — Massey Bean & Lewis

(57) ABSTRACT

A shifting method of a transmission for a work vehicle including a main shifting unit and a sub-shifting unit includes: providing a main shifting unit including a plurality of main shifting gear pairs and at least one main hydraulic shifting device for transmitting power by selecting one of the main shifting gear pairs; providing a sub-shifting unit including a plurality of sub-shifting gear pairs, at least one synchromesh for transmitting power by selecting one of the sub-shifting gear pairs, and a sub-shifting actuator for operating the synchromesh; separating all of the main hydraulic shifting devices from the main shifting gear pairs before shifting using the sub-shifting unit; and shifting the sub-shifting unit by operating the synchromesh using the sub-shifting actuator.

2 Claims, 5 Drawing Sheets

(56) References Cited

U.S. PATENT DOCUMENTS

| | | | | |
|---|---|---|---|---|
| 4,388,843 A * | 6/1983 | Teeter | F16H 3/095 | 74/473.23 |
| 4,802,384 A * | 2/1989 | Schwarz | F16H 61/08 | 74/335 |
| 6,138,528 A * | 10/2000 | Fukumoto | F16H 61/16 | 74/745 |
| 6,241,066 B1 * | 6/2001 | Asada | F16H 61/702 | 74/335 |

FOREIGN PATENT DOCUMENTS

| | | |
|---|---|---|
| JP | 2007-155019 | 6/2007 |
| JP | 3940195 | 7/2007 |
| JP | 2007-321949 | 12/2007 |
| JP | 2010-091094 | 4/2010 |

* cited by examiner

[Fig. 5]
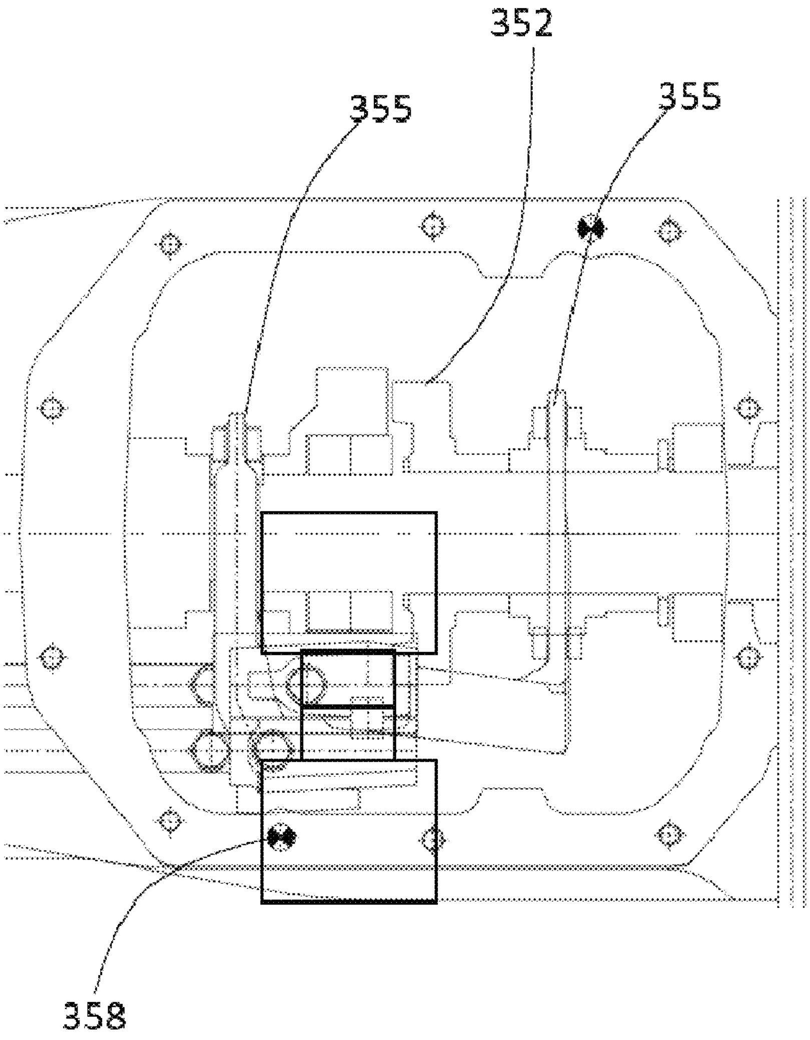

SHIFTING METHOD OF TRANSMISSION FOR WORK VEHICLE, AND TRANSMISSION FOR WORK VEHICLE

TECHNICAL FIELD

The present disclosure relates to a shifting method of a transmission for a work vehicle, the shifting method being able to shift without operating a clutch in a transmission including a main shifting unit and a sub-shifting unit, and relates to a transmission for a work vehicle for the shifting method.

BACKGROUND ART

A work vehicle may mean a vehicle that can additionally perform work for convenience of human life in a vehicle for moving. A work vehicle can function as a transport device that moves workers to specific positions using a driving source such as an engine and can use the power from a driving source for purposes other than running while moving with workers or maintaining a stop state at specific positions.

As general work vehicles, there may be agricultural work vehicles such as a combine or a tractor and there may also be work vehicles that perform different kinds of work at a construction site, a factory, or the like.

Referring to Japanese Patent No. 3940195, a work vehicle including a PTO has been disclosed therein. The work vehicle includes an engine, a transmission, and a PTO device, in which a portion of power from the engine is transmitted to driving wheels, etc. and used for running and the other is transmitted to the PTO device, etc. and can be used for purposes other than running.

The transmission includes a front housing, a transmission housing, and a rear housing, and includes, therein, a running power transmission unit that transmits power from the engine to the driving wheel, etc. and a PTO power transmission unit for work other than running. As the running power transmission unit, a switching unit, a main shifting unit, and a sub-shifting unit are included. The switching unit is positioned at the front housing, the main shifting unit and the sub-shifting unit are positioned at the transmission housing, and a front-wheel driving case is positioned under the transmission housing, whereby it is possible to selectively transmit power to a transmission shaft.

In general, since a switching unit, a main shifting unit, and a sub-shifting unit are separate shifting devices, they are operated by different operation levers, respectively, and substantially, and a lever for operating a main shifting unit and a lever for operating a sub-shifting unit are separately provided around a driver seat. In addition, agricultural tractors, etc. are equipped with many levers such as a PTO shifting lever, a PTO clutch lever, and forward/backward lever, etc., so they may be a large burden to workers. Since workers who are beginners cannot perform smooth operation due to many levers, so the usability is deteriorated, and there is a high possibility that even skilled workers make malfunction by operating wrong levers by mistake.

A sub-shifting unit is not frequently used in comparison to the main shifting unit, so a constant engaging type or a selective sliding type is generally applied. Accordingly, there was also inconvenience of temporarily stop running to operate a sub-shifting unit and then moving after shifting in the related art.

DISCLOSURE

Technical Problem

The present disclosure provides a transmission for a work vehicle that can perform multi-stage shifting without complex lever operation or clutch operation, and a shifting method using the transmission.

In particular, the present disclosure provides a transmission for a work vehicle that can simplify lever operation of a main shifting unit and a sub-shifting unit, which are frequently used in comparison to other levers, can improve convenience for workers by reducing clutch pedal operation that was required in every shifting, can reduce frequency of malfunction, and can increase spatial usability by simplifying designing of a driver seat, and provides a shifting method using the transmission.

The present disclosure provides a work vehicle and a transmission that can achieve shifting by operating a button or automatically in shifting by a main shifting unit and a sub-shifting unit that are frequently used.

The present disclosure provides a work vehicle and a transmission that enable simple operation through integration of shift levers by achieving shifting in an electric type or a hydraulic type.

Technical Solution

According to an exemplary embodiment of the present disclosure for achieving the objectives of the present disclosure described above, a shifting method of a transmission for a work vehicle including a main shifting unit and a sub-shifting unit includes: providing a main shifting unit including a plurality of main shifting gear pairs and at least one main hydraulic shifting device for transmitting power by selecting one of the main shifting gear pairs; providing a sub-shifting unit including a plurality of sub-shifting gear pairs, at least one synchromesh for transmitting power by selecting one of the sub-shifting gear pairs, and a sub-shifting actuator for operating the synchromesh; separating all of the main hydraulic shifting devices from the main shifting gear pairs before shifting using the sub-shifting unit; and shifting the sub-shifting unit by operating the synchromesh using the sub-shifting actuator.

In this embodiment, all of the main hydraulic shifting devices are separated from the main shifting gear pairs before shifting using the sub-shifting unit, so it is possible to reduce inertia moment that is applied to the sub-shifting unit, and as the inertia moment is reduced, it is possible to shift using the synchromesh.

For reference, since a constant engaging type or a selective sliding type was used in the related art, it was required to stop running to switch the sub-shifting unit, but, in this embodiment, it is possible to complete shifting even without stopping running because it is possible to use a synchromesh and shift using the synchromesh by separating the e main shifting unit or the gear pairs at the upstream side.

Further, it is possible to perform general automatic, electronic, and hydraulic control, it is possible to perform multi-stage shifting even without complex lever operation or clutch operation, and particularly, it is possible to remarkably improve convenience for workers by achieving easy operation of the main shifting unit and the sub-shifting unit that are frequently used.

Shifting by a main shifting unit and a sub-shifting unit was performed by operating two levers and combining them, but, in this embodiment, it is possible to simply control shifting by operating buttons such as 'up' and 'down'.

The sub-shifting actuator may be operated by electricity or hydraulic pressure and may be indirectly automatically controlled rather than directly controlled using a lever.

The synchromesh of the sub-shifting unit may be controlled by one sub-shifting actuator, and is operated by an integrated lever or a mono lever, whereby it is possible to increase usability and operability of electronic control or indirect control.

A hydraulic shifting valve device for controlling the main hydraulic shifting device may be provided, and the hydraulic shifting valve device can control the hydraulic shifting device, which uses a plurality of friction plates, etc., using a proportional control valve or an on-off control valve.

According to an exemplary embodiment of the present disclosure for achieving the objectives of the present disclosure described above, a transmission for a work vehicle includes a main shifting unit and a sub-shifting unit, in which the main shifting unit includes a plurality of main shifting gear pairs and at least one main hydraulic shifting device for transmitting power by selecting one of the main shifting gear pairs, and the sub-shifting unit may include a plurality of sub-shifting gear pairs, at least one synchromesh for transmitting power by selecting one of the sub-shifting gear pairs, and a sub-shifting actuator for operating the synchromesh.

The main hydraulic shifting device may be provided for the main shifting gear pairs, respectively, and may be separately controlled by the hydraulic shifting valve device. Further, the hydraulic shifting valve device may use a proportional control valve or an on-off control valve.

The sub-shifting actuator may be operated by electricity or hydraulic pressure, and the synchromesh of the sub-shifting unit may be designed to be controlled by one sub-shifting actuator for integration of control or precise control.

Advantageous Effects

According to the transmission for a work vehicle and the shifting method thereof of the present disclosure, it is possible to perform multi-stage shifting without complex lever operation or clutch operation, and particularly, it is possible to reduce fatigue of workers by reducing use of a main shifting operation unit and a sub-shifting operation unit that are frequently used.

According to the transmission for a work vehicle and the shifting method thereof of the present disclosure, it is possible to achieve shifting by a main shifting unit and a sub-shifting unit, which are frequently used, by operating buttons or automatically, so it is possible to remove complexity due to lever operation and a combination thereof.

Simple operation is possible through integration of shift levers by achieving shifting operation in an electric or hydraulic type, it is not required to stop a vehicle during running to shift through the sub-shifting unit, and it is possible to smoothly shift even without stopping a vehicle.

DESCRIPTION OF DRAWINGS

FIG. 5 is a plan view showing the internal structure of the transmission of FIG. 1.

MODE FOR INVENTION

Figure 1:
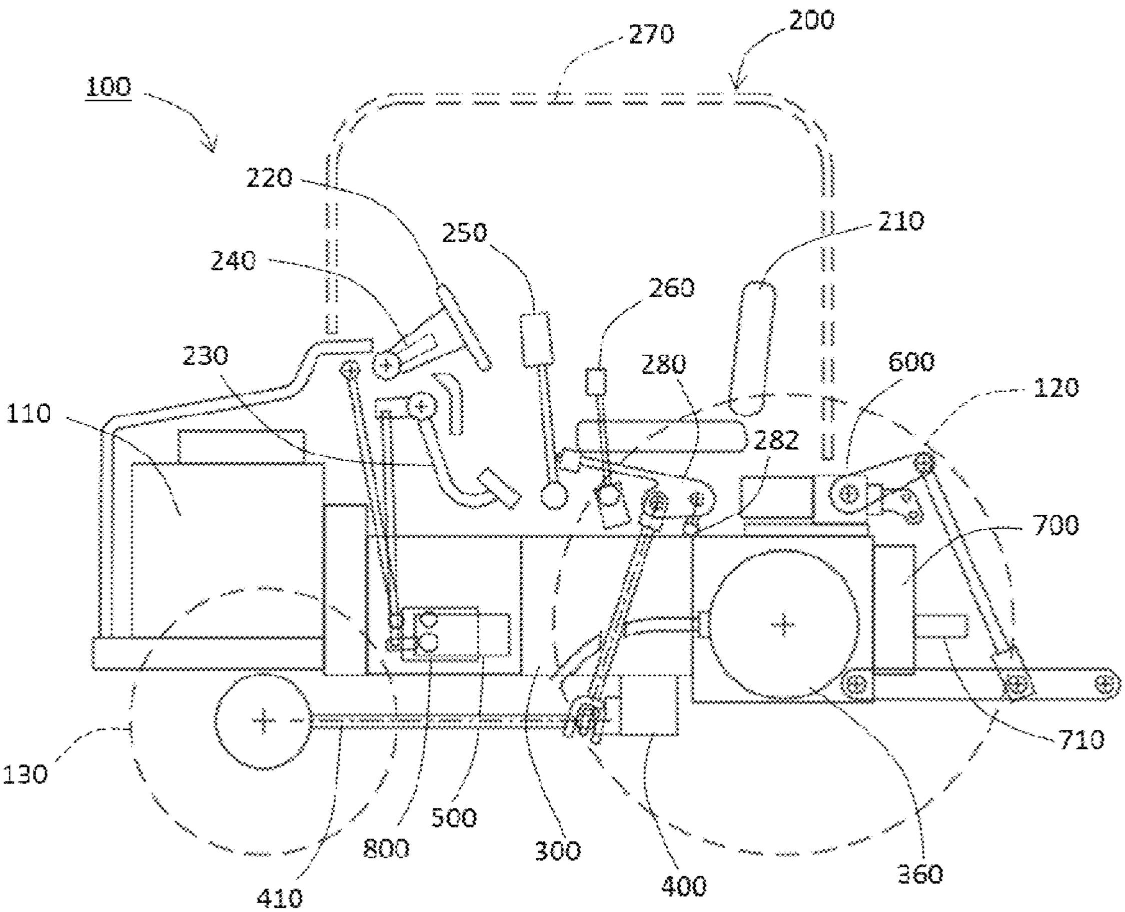
FIG. 1 is a view illustrating a work vehicle and a transmission according to an embodiment of the present disclosure.

Hereafter, preferred embodiments of the present disclosure will be described in detail with reference to the accompanying drawings, but the present disclosure is not limited or restricted to the embodiments. For reference, the same reference numerals substantially indicate the same components in the description, it is possible to refer to the matters shown in other figures under this rule, and matters that are determined as being apparent or repetitive to those skilled in the art may be omitted.

Figure 2:
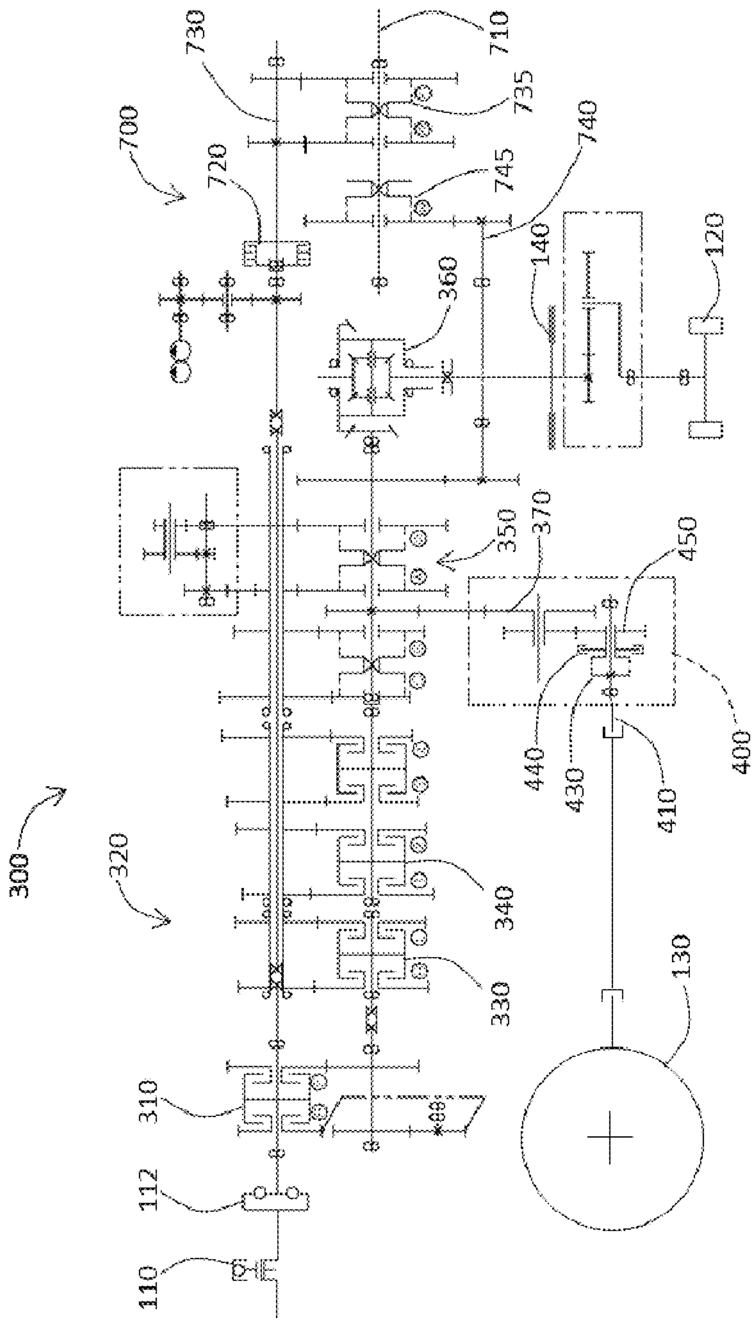
FIG. 2 is a view illustrating a power transmission structure of the work vehicle and the transmission of FIG. 1.
Figure 3:
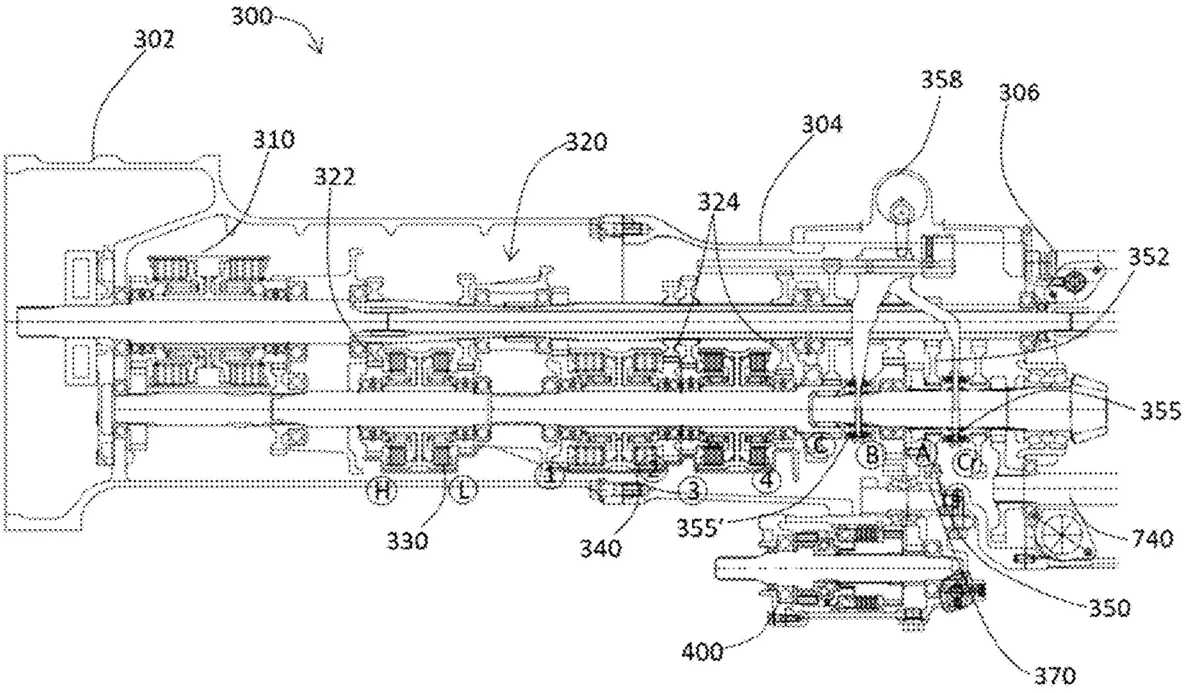
FIG. 3 is a view showing the internal structure of the transmission of FIG. 1 seen from a side.
Figure 4:
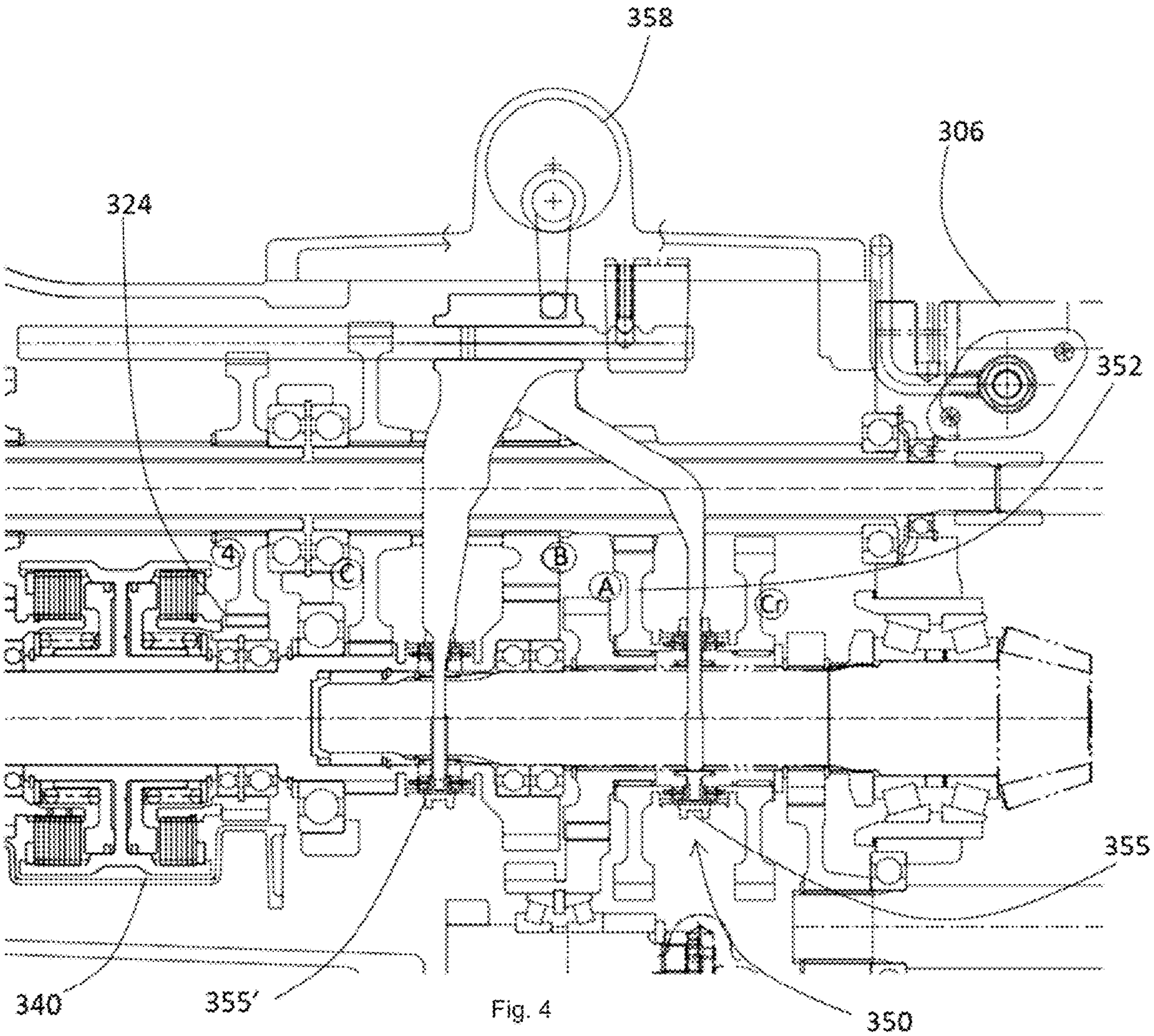
FIG. 4 is a view illustrating a sub-shifting unit of the internal structure of the transmission of FIG. 1.

FIG. 1 is a view illustrating a work vehicle and a transmission according to an embodiment of the present disclosure, FIG. 2 is a view illustrating a power transmission structure of the work vehicle and the transmission of FIG. 1, FIG. 3 is a view showing the internal structure of the transmission of FIG. 1 seen from a side, FIG. 4 is a view illustrating a sub-shifting unit of the internal structure of the transmission of FIG. 1, and FIG. 5 is a plan view showing the internal structure of the transmission of FIG. 1.

Referring to FIGS. 1 to 5, a work vehicle 100 according to the embodiment may include a driving source 110, rear wheels or first driving wheels 120, front wheels or second driving wheels 130, a user driving section 200, a transmission 300, a power extraction device 400, a hydraulic shifting valve device 500, a hydraulic PTO valve device 600, and a PTO device 700.

The driving source 110 such as an engine generates power and power from the driving source 110 is shifted or controlled through the transmission 300 and can be used for running or work other than running.

The transmission 300 can transmit the entire or a portion of power transmitted from the driving source 110 to the first driving wheels 120 or the second driving wheels 130 for running, and power for work other than running can be transmitted to the PTO device 700. The power transmitted to the PTO device 700 can be transmitted from the driving source 110 that is an engine without shifting and rotation is possible at 540 rpm, 1000 rpm, or at a rotation speed (GSP) proportioned to a running speed with the driving source 110 generating maximum or optimum torque. Shifting in the PTO device 700 may be performed by a PTO power transmission unit 730, etc.

To this end, the PTO device 700 may include a first power transmission unit 730 for independent multi-shifting and a second power transmission unit 740 for vehicle speed synchronization shifting. The first power transmission unit 730 can directly receive power from the driving source 110 regardless of the rotation direction of the switching unit 310 and can shift power connected through the PTO clutch 720 to P1 and P2 and transmit it to the PTO output shaft 710. The second power transmission unit 740 is connected with the shaft of the sub-shifting unit 350 and can receive power in synchronization with a vehicle speed.

The user driving part 200 may include a driver seat 210, a steering wheel 220, a clutch pedal 230, a forward/backward operation unit 240, a main shifting operation unit 250, and a sub-shifting operation unit 260. A user can control the running direction of the work vehicle 100 through the handle 220 and can control the rotation direction of the driving wheels through the forward/backward operation unit 240. In this embodiment, a sub-shifting operation unit cannot be additionally included, but it is possible to shift through two buttons (+, −) of the main shifting operation unit 250 even without operating a clutch and it is not required to stop running for shifting.

The clutch pedal 230 may be positioned at left side under the handle 220, a brake pedal may be provided at the right side, and a parking brake 280 may be provided under the driver seat 210. The brake pedal may be connected with a valve of a brake system that is operated by hydraulic pressure, and as the brake pedal is operated, a first brake 140 to be described below can be operated.

In this embodiment, the user driving section 200 may be provided in an exposed type, but, depending on cases, it may include a cabin 270.

The forward/backward operation unit 240 or the main shifting operation unit 250 can adjust combinations of shift gears through a hydraulic shifting valve device 500, and in this process, operation types of a hydraulic type, an electric type, a manual type, or the like may be used.

The transmission 300 may be divided into a front housing 302, a transmission housing 304, and a differential housing 306, and the main shifting unit 320 and the sub-shifting unit 350 may be positioned in the transmission housing 304. Power that has passed through the transmission 320 through the main shifting unit 320 and the sub-shifting unit 350 can be transmitted to the rear wheels, that is, the first driving wheels 120 through a first differential 360. Depending on cases, it is possible to extract a portion of power to a front-wheel output shaft 410 and transmit it to the front wheels, that is, the second driving wheels 130 through the driving extraction device 400. When the second driving wheels 130 receive power together with the first driving wheels 120 through the power extraction device 400, the work vehicle 100 can run in a four-wheel mode and the four-wheel mode can be usefully applied to move the work vehicle 100 on rough terrain, a rice field, a dry field, or the like. However, it may be efficient to run in a two-wheel mode rather than a four-wheel mode when running on a common road, etc., and in this case, the power extraction device 400 can switch to a two-wheel mode, in which the second driving wheels 130 are manually rotated, without transmitting power to the front-wheel output shaft 410.

The first brake 140 may be mounted between the first differential 360 and the first driving wheels 120. The first brake 140 can stop the work vehicle 100 by suppressing rotation of the first driving wheels 120 that mainly contribute to running. For reference, a pedal for operating the first brake 140 may be provided in the user driving section 200 and may be provided at a side or both sides of the driver seat.

Power from the engine can be connected to the first driving wheels 120, the second driving wheels 130, the PTO device 700, or the like through the transmission 300, and a switching unit 310, a main shifting unit 320, a sub-shifting unit 350, the first differential 360, etc. may be provided in the transmission 300.

Referring to FIG. 2, power from the driving source 110 can be applied to forward movement or backward movement through the switching unit 310 and the main shifting unit 320 may include a first main shifting gear pair transmitting a high speed H or a low speed L, a high-speed/low-speed hydraulic clutch 330 that is a main hydraulic shifting device, a second main shifting gear pair 324 corresponding to a first stage to a fourth stage (①~④), and a main shifting hydraulic clutch 340 that is another main hydraulic shifting device connecting a gear pair selected in correspondence to the second main shifting gear pair 324.

The high-speed/low-speed hydraulic clutch 330 and the main shifting hydraulic clutch 340 can enable shifting into a total of 8 stages as the main hydraulic shifting device of the main shifting unit 320 and can connect the main shifting gear pairs 322 and 324 that are assigned using a plurality of friction plates.

The high-speed/low-speed hydraulic clutch 330 and the main shifting hydraulic clutch 340 may be connected to the hydraulic shifting valve device 500 through a proportional control valve or an on-off control valve and may be controlled to be supplied with oil through operation of a button rather than direction connection by a lever.

The sub-shifting unit 350 can additionally adjust a shifting region to rotation shifted by the main shifting unit 320, and, as shown in the figures, may include synchromeshes 355, 355' transmitting power by selecting one of three or more sub-gear pairs 352, and a single sub-shifting actuator 358 for operating the synchromeshes 355, 355'. The sub-shifting unit 350 can control a sub-shifting range to a section A, B, C, or Cr (creep) by using the synchromeshes 355, 355' reciprocating between the sub-gear pairs 352 or approaching or moving away from the sub-gear pairs.

The high-speed/low-speed hydraulic clutch 330 and the main shifting hydraulic clutch 340, which are hydraulic clutches using a friction plate, are connected to six gear pairs 322 and 324, respectively, and can shift into a total of 8 stages through shifting of two steps determining high speed H/low speed L and shifting of four steps from the first stage to the fourth stage, and the synchromeshes 355, 355' can shift into four stages of A, B, C, and Cr, whereby shifting of a total of 32 steps is possible. For reference, in another embodiment, the Cr step may be omitted in sub-shifting unit, and, in this case, shifting of a total of 24 steps may be possible. It is possible to design shifting steps of other combinations.

The synchromeshes 355, 355' may be provided using a synchronizer hub, a sleeve, a ring, a key, a spring, etc., and the related art can be referred to for the details of the synchromeshes 355, 355'. However, in this embodiment, in order to reduce the burden of inertia moment in the process of shifting through the synchromeshes 355, 355', it is possible to separate all of the main shifting gear pairs 322 and 324 and the clutches 330 and 340 connected thereto, before shifting using the sub-shifting actuator 358, and it is possible to use the hydraulic shifting valve device 500.

A portion of power from the engine may be transmitted to the PTO device 700 without passing through the switching unit 310, the main shifting unit 320, or the like, and power transmitted to the POT device 700 can drive a tandem pump, etc. and may drive a PTO output shaft 710 through the hydraulic PTO valve device 600. Power can be transmitted to the PTO output shaft 710 through the PTO clutch 720 and the first power transmission unit in the PTO device 700.

Of course, the other of the power from the engine may be transmitted to the PTO device 700 as well through the switching unit 310, the main shifting unit 320, or the like, and the power transmitted to the PTO device 700 may be transmitted at revolutions per minute proportioned to or corresponding to the running speed and can be used for work sensitive to a vehicle speed such as rice transplantation. Power that is synchronized with a vehicle speed can be transmitted to the PTO output shaft 710 through the second power transmission unit 740 in the PTO device 700.

A gear for extracting power to the outside may be mounted on the shaft on which the shift clutch is mounted in the sub-shifting unit 350, and a driving extraction gear 370 is provided at an end thereof. The driving extraction gear 370 may be partially exposed from the housing of the transmission 300 and the driving extraction device 400 may be mounted in the region in which the driving extraction gear 370 is exposed.

The driving extraction device 400 can transmit power transmitted from the transmission 300 to the second driving wheels 120 through the front-wheel output shaft 410. The driving extraction device 400 may include an extraction housing, an extraction clutch 430, and a second brake 440, and the extraction clutch 430 can connect/disconnect power that is transmitted to the front-wheel output shaft 410 from the transmission 300. In this configuration, the extraction clutch 430 may be provided using a dog clutch, etc.

Referring to FIGS. 2 and 3, the one sub-shifting actuator 358 of the transmission 300 can move a shift fork for operating the synchromeshes 355, 355' using an electric motor, a step motor, etc., and it is possible to adjust the synchromeshes 355, 355' for shifting into four stages of A, B, C, and Cr using one sub-shifting actuator 358.

Before shifting using the sub-shifting actuator 358, it is possible to disengage all of the main shifting hydraulic clutch or the main hydraulic shifting devices 330 and 340 around the transmission 300 from the first main shifting gear pair 322 and the second main shifting gear pair 324. By disengaging the main shifting gear pairs 322 and 324 and the hydraulic clutch, it is possible to reduce the inertia moment of the rotation members positioned at the upstream side further than the synchromeshes 355, 355' and it is possible to reduce shifting shock that may be generated when the synchromeshes 355, 355' is coupled.

Further, the after one of the synchromeshes 355, 355' is connected to the sub-shifting gear pair 352, previously connected or new main shifting gear pairs 322 and 324 and the hydraulic clutch may be connected. In this case, the hydraulic shifting valve device 500 operates the hydraulic clutch including a proportion control valve, thereby being able to absorb shock as well that may be generated when the main shifting unit 320 is connected.

Since a sub-shifting unit uses a constant engaging type or a selective sliding type in the related art, it is required to stop running to switch the sub-shifting unit, but, in this embodiment, a synchromesh is used and a burden on the synchromesh is reduced and the defects of the synchromesh are removed by separating the main shifting unit or the gear pairs at the upstream side, and it is possible to complete smooth shifting when coupling the main shifting unit again using a proportion control valve or an on-off control valve. As a result, it is not required to stop running even when shifting the sub-shifting unit.

It is possible to perform smooth shifting using two buttons (+, −) of the main shifting operation unit 250 and it is possible to perform general automatic, electronic, and hydraulic control, so it is possible to perform multi-stage shifting even without complex lever operation or clutch operation. For reference, it is necessary to operate a clutch when operating a main shifting unit and a sub-shifting unit in transmissions of the related art and they are frequently used, but, in the transmission 300 according to this embodiment, it is possible to shift even without operating a clutch, so it is possible to improve convenience for users and workers and reduce fatigue due to complex operation.

An electric motor, a step motor, etc. are used as the sub-shifting actuator 358 in this embodiment, but it is also possible to operate the shift fork using a hydraulic device rather than an electric device.

Although exemplary embodiments of the present disclosure were described above with reference to the drawings, it should be understood that the present disclosure may be changed and modified in various ways by those skilled in the art without departing from the spirit and scope of the present disclosure described in claims.

| Description of Reference Numerals | |
|---|---|
| 100: work vehicle | 110: driving source |
| 140: first brake | 200: user driving section |
| 300: transmission | 310: switching unit |
| 320: main shifting unit | |
| 322, 324: main shifting gear pair | |
| 330: high-speed/low-speed hydraulic clutch | |
| 340: main shifting hydraulic clutch | |
| 350: sub-shifting unit | |
| 352: sub-shifting gear pair | |
| 355: synchromesh | |
| 358: sub-shifting actuator | |
| 400: driving extraction device | |
| 500: hydraulic shifting valve device | |
| 600: hydraulic PTO valve device | |
| 700: PTO device | |

The invention claimed is:

1. A shifting method of a transmission for a work vehicle including a main shifting unit and a sub-shifting unit, the shifting method comprising:

providing a main shifting unit including a plurality of main shifting gear pairs and at least one main hydraulic shifting device for transmitting power by selecting one of the main shifting gear pairs;

providing a sub-shifting unit including a plurality of sub-shifting gear pairs corresponding to at least three stages, at least two synchromeshes for transmitting power by selecting one of the sub-shifting gear pairs, and a single sub-shifting actuator for operating the synchromeshes;

separating all of the main hydraulic shifting devices from the main shifting gear pairs before shifting using the sub-shifting unit; and shifting the sub-shifting unit by operating the at least two synchromeshes using the single sub-shifting actuator, wherein the at least one main hydraulic shifting device includes a proportional control valve or an on-off control valve, wherein the synchromeshes are solely operated by the single sub-shifting actuator, and wherein the single sub-shifting actuator is operated by electricity or hydraulic pressure.

2. The shifting method of claim 1, wherein a hydraulic shifting valve device for controlling the main hydraulic shifting device is provided, and the hydraulic shifting valve device is provided using a proportional control valve or an on-off control valve.

* * * * *